UNITED STATES PATENT OFFICE.

HENRY S. SPACKMAN, OF ARDMORE, PENNSYLVANIA, AND ELLIS W. LAZELL, OF WILMINGTON, DELAWARE; SAID LAZELL ASSIGNOR TO SAID SPACKMAN.

CEMENTITIOUS MATERIAL.

1,029,954. Specification of Letters Patent. Patented June 18, 1912.

No Drawing. Application filed July 11, 1911. Serial No. 637,903.

*To all whom it may concern:*

Be it known that we, HENRY S. SPACKMAN, a resident of Ardmore, Montgomery county, State of Pennsylvania, and ELLIS W. LAZELL, formerly a resident of the city and county of Philadelphia, State of Pennsylvania, and now a resident of Wilmington, county of Newcastle, and State of Delaware, have made a certain new and useful Invention Relating to Cementitious Materials, of which the following is a specification.

This invention relates to cementitious, that is to say, plastic materials or compositions, such as plasters, hydraulic and other cements, comprising incorporated calcium aluminates or equivalent strength accelerating material, and to such energizing material and to its preparation and incorporation with other cementitious material comprising available lime or similar earthy alkali material, to accelerate the cementitious or binding properties thereof.

Calcium aluminum compounds of substantially the composition of calcium aluminates which contain from one to three molecules of lime to one of alumina may be prepared by calcining finely ground lime and bauxite or other aluminum compound, such as kaolin or high aluminum clays, the burned material when lime and bauxite are employed being sintered and giving a very quick initial set when ground and moistened with water. Calcium aluminate material, such as is formed preferably by thoroughly calcining or sintering a relatively small proportion of available lime as compared with the available alumina present, attains its initial set after a relatively long period and its final set in a relatively short time thereafter. Such low-lime calcium aluminate cement materials, besides being themselves more or less strongly hydraulic and cementitious, exert a valuable energizing action on cementitious material comprising lime or other earthy alkali material (such as magnesia, baryta, strontia, or other material capable of combining with coöperating silicious material and calcium aluminate strength accelerating material). When incorporated for example with natural cements their cementitious or binding properties are eccelerated so as to greatly increase the early sand strengths of the mixed material in the same general way as when using the high lime calcium aluminate material formed by the union of one to three or more molecular weights of lime to one of alumina; while at the same time it is easier to prevent the composition having an undesirably quick initial set. Such low-lime calcium aluminates may preferably be prepared by uniting suitably proportioned mixtures of finely ground lime, magnesia or other earthy alkali with bauxite or other material rich in alumina or alumina-like material, the components being incorporated in such proportions that the lime for example is present to the extent of not more than about thirty-three per cent. of the alumina available for combination therewith, after making due allowance for the lime required by any other components which may be present. These calcium aluminate accelerating or cement materials may be conveniently prepared by heating to the extent required to cause sufficient union of the components to develop the desired strength accelerating, slow-setting or other properties, as by calcination to a clinkering or sintering temperature and if desired the material without the necessity of grinding may be still further heated to complete fusion as in a blast furnace after which it may be advantageously granulated in water or otherwise before being ground, the higher the temperature of union the slower as a general thing is the setting action. It is of course understood that iron oxid or similar material may be used in some cases to replace to some extent at least the alumina in this accelerating material, and that other earthy alkali material, such as magnesia and so forth, may be substituted for part at least of the lime combined, that is, more or less closely united therewith, such calcium aluminates and equivalent or substitute accelerating or energizing material being designated earthy alkali, strength accelerating compounds of alumina-like material.

Suitable proportions of calcium aluminate or similar strength accelerating material and also if desired of controlling material to assist in effecting the desired quickness of set and increase of strength may be prepared and incorporated at any time before utilization with the independently cementitious material comprising oxids, hydrates or otherwise available lime or similarly acting earthy alkali material combining or capable of combining with the aluminous accelerating material and coöperating silicious material which may also be present if desired; suitable controlling material such as sulfate of lime, sulfuric acid and in the case of plastic compositions, glue, starch, etc., may also be uniformly incorporated. The aluminous accelerating material preferably in finely divided condition may be prepared and incorporated before or after the gaging of the cementitious material or may be dissolved or incorporated in the gaging water; preferably, however, the strength accelerating and controlling material may be uniformly incorporated with the independently cementitious material so as to form a finely divided material convenient for transportation and utilization since it becomes immediately effective when water is added thereto.

Hydraulic cements having high strengths at early periods and comprising large proportions of such calcium aluminate cement material or the like, with coöperating lime or equivalent earthy alkali material in connection with coöperating silicious material and controlling material if desired, may be prepared by having present a sufficient proportion of slow-setting calcium aluminate to give the desired setting time to the compositions, which in many cases have sand strengths at early periods considerably in excess of the standard Portland cement requirements; many mixtures of slow-setting low-limed calcium aluminate with higher limed, quick setting calcium aluminate produce cements having much greater strength than ordinary Portland cements and partaking of the slow-setting qualities of low lime calcium aluminates. An illustrative composition of this character may be prepared by making a finely divided mixture of low lime, slow-setting, hydraulic, highly cementitious, calcium aluminate produced by thorough calcination and having the following approximate analysis:

Silica ($SiO_2$)_____ 2.12%
Alumina ($Al_2O_3$)_____ 65.32
Iron ($Fe_2O_3$) _____ 12.16
Lime (CaO) _____ 20.94
Magnesia (MgO)_____ .44
Volatile matter_____ None.

and an equal proportion of a diversely prepared calcium aluminate higher in lime, having an initial set of five minutes and a final set of seven minutes and containing:

Silica ($SiO_2$)_____ 2.76%
Alumina ($Al_2O_3$)_____ 37.27
Iron ($Fe_2O_3$) _____ 6.47
Lime (CaO) _____ 47.12
Magnesia (MgO)_____ .46
Volatile matter_____ 2.20

This composite hydraulic composition when tested according to the standard methods adopted by the American Society of Civil Engineers and prescribed by the American Society for Testing Materials in conjunction with the standard specifications for testing of Portland cements, gave the following results:

Setting time: Gilmore's needle per cent. of water, 28; initial set, 5 hrs.; final set, 5 hrs. 30 min.; constancy of volume: O. K.

Tensile test: 1 part mixture, 3 parts sand; kept in water after 24 hours.

| | 24 hours. | 7 days. | 28 days. | 3 months. |
|---|---|---|---|---|
| | Lbs. 375 | Lbs. 515 | Lbs. 510 | Lbs. 685 |
| | 395 | 485 | 515 | 705 |
| | 385 | 500 | 512 | 695 |
| Average | 385 | 500 | 512 | 695 |

Tensile test: same 1 to 3 mixture, kept in air.

| | 7 days. | 28 days. | 3 months. |
|---|---|---|---|
| | Lbs. 370 | Lbs. 580 | Lbs. 775 |
| | 360 | 595 | 785 |
| | 380 | 565 | 765 |
| Average | 370 | 580 | 775 |

The quickness of set can, of course, be controlled to a considerable extent by varying the proportions of the slow-setting and quick-setting calcium aluminates used and it may also be regulated by a small addition of suitable retarding agent. Many of these calcium aluminate or similar cement materials are themselves desirable cements although a small proportion at least of hydrated or otherwise available lime usually increases their cementitious properties. Other materials may be incorporated with such composite, hydraulic, slow-setting strength accelerator if desired, such as hydraulic, independently cementitious materials, or if desired suitable proportions of finely divided, inert materials or stretchers, such as finely ground silica which may be used up to about twice the amount of the combined calcium aluminate material where the cement is to be used for ordinary purposes. An illustrative composition of this character may be prepared by mixing fifty parts of finely ground sand, twenty-five parts of the above slow-setting, low-lime calcium aluminate, twenty-five parts of the higher lime, quick setting calcium aluminate, all being ground to such fineness as to pass the #100 mesh sieve. This cement when tested in the usual manner for Portland cement with the addition of three parts, by weight, of standard Ottawa sand, gave the following results:

Setting time: initial set, 4 hrs. 35 minutes; final set, 6 hrs. 39 minutes.

Tensile tests: 24 hours, 168 lbs.; 7 days, 198 lbs.; 28 days, 240 lbs.

A similar composition using inert stretchers was made of one half of this slow-setting, low-lime calcium aluminate, one-half finely ground sand. This when tested in the manner usual for Portland cement with the addition of three parts, by weight, of standard Ottawa sand, gave the following physical tests:

Tensile tests: 24 hours, 83 lbs.; 7 days, 198 lbs.; 28 days, 332 lbs.

The low-lime, slow-setting calcium aluminate cement materials when used alone have a longer period of plasticity, not acquiring their initial set as a rule under ten hours but develop very high strength shortly afterward. An illustrative example, when tested in the usual manner for Portland cement did not acquire its initial set under ten hours yet when tested one part cement to three parts sand, by weight, gave at 24 hours 233 pounds, and at seven days 435 pounds. Such low-lime, slow-setting calcium aluminate cement material and also composite strength accelerating material comprising the same in admixture with high-lime, quick setting calcium aluminate materials may of course be used when incorporated with suitable proportions of lime. Such slow-setting, strength accelerating material is of course desirable for incorporation with quick-setting natural cements or other quick-setting cementitious materials, it being possible to incorporate considerably larger proportions of the strength accelerating material when these low-lime, slow-setting aluminates are used, or, if desired, to omit or reduce in many cases the calcium sulphate retarding material usually employed to prevent undesirably quick set.

The following comparative test shows the different effect of incorporating with natural cement of the character indicated ten per cent. of low-lime, slow setting calcium aluminate, such as described, and a similar proportion of quick-setting, hydraulic calcium aluminate, two per cent. of calcium sulfate being present in all cases; it being, of course, understood that such highly cementitious material produced by the incorporation of the aluminates fulfills the constant volume and sand strength requirements for standard Portland cement.

|  | Natural cement. | Natural cement with 10% slow setting aluminate. | Natural cement with 10% higher lime aluminate. |
| --- | --- | --- | --- |
| Initial set | 1 hr. 35 min. | 3 hrs. 14 min. | 20 minutes. |
| Final set | 2 hrs. 40 min. | 4 hrs. 14 min. | 30 minutes. |
| Tensile strengths: 1 part cement, 3 parts sand— | | | |
| 24 hrs | No strength. | 175 lbs. | 150 lbs. |
| 7 days | 95 lbs. | 288 lbs. | 200 lbs. |
| 28 days | 156 lbs. | 368 lbs. | 270 lbs. |

Several illustrative examples of slow-setting, hydraulic, aluminous, strength accelerating materials containing considerable silica and which were completely fused during their manufacture so as to have comparatively slight strengths at early periods when used alone or in the absence of available lime were produced in a blast furnace using iron ores containing approximately fourteen per cent. of alumina, these aluminous slags had the following approximate analyses:

|  | No. 1 | No. 2 |
| --- | --- | --- |
| Silica ($SiO_2$) | 29.12% | 31.96% |
| Alumina ($Al_2O_3$) | 34.28 | 28.94 |
| Iron (Fe) | 2.40 | 2.39 |
| Lime (CaO) | 29.82 | 28.46 |
| Magnesia (MgO) | 2.32 | 3.78 |

The following comparative test shows the result of incorporating ten per cent. of the strength accelerating material indicated in the second analysis given above with the following natural cement in comparison with a similar incorporation of quick-setting, higher lime aluminate, strength accelerating material with the same natural cement.

|  | Natural cement. | Natural cement with 10% slow setting low lime aluminate. | Natural cement with 10% higher lime aluminate. |
| --- | --- | --- | --- |
| Initial set | 1 hr. 35 min. | 6 hrs. 9 min. | 20 minutes. |
| Final set | 2 hrs. 40 min. | 8 hrs. | 30 minutes. |
| Tensile test: 1 part cement, 3 parts sand. | | | |
| 7 days | 95 lbs. | 230 lbs. | 200 lbs. |
| 28 days | 156 lbs. | 335 lbs. | 270 lbs. |

The fused calcium aluminate strength accelerating material having the second analysis given above, when mixed with an equal proportion of low-lime calcined calcium aluminate material such as referred to in connection with the first analysis given in this application, produced a slow-setting highly cementitious material which gave when tested in the ordinary way for cement with three parts of sand the following tensile strengths: 180 pounds at seven days, 490 pounds at twenty-eight days and 530 pounds at three months. Such high alumina, high silica material can also be advantageously used either alone or in conjunction with low-lime, slow-setting calcium aluminate as an addition to independently cementitious material, such as lime. Similar composite aluminate strength accelerating materials produce hydraulic highly cementitious material when incorporated with considerable proportions of finely ground inert materials, silicious stretchers or coöperating silicious and other materials and may be advantageously incorporated with natural cements, for example: a mixture containing ten parts fused calcium aluminate containing considerable proportions of silica, analysis #2, two parts plaster, eighty-eight parts natural cement, when tested in the manner usual for cement had an initial setting time of 6 hours 9 minutes and a final setting time of 8 hours; and when tested in water with three parts of sand had 230 pounds tensile strength at seven days and 335 pounds at twenty-eight days. Such fused aluminous and other calcium aluminate strength accelerating material may be advantageously incorporated in comparatively small proportions with suitable plaster or cementitious material such as lime or similar alkali material, these compositions comprising from about one to ten per cent. of incorporated alumina and having greatly increased setting spreading and sand-carrying properties. Such suitable illustrative plaster compositions may be prepared by incorporating five to twenty per cent. of such fused calcium aluminate strength accelerating cement material with ordinary hydrated lime, in connection, if desired, with suitable stretchers or other ingredients. The following table shows the tensile strengths when tested with four parts of commercial sand, of hydrated lime with which ten and fifteen per cent. of this fused aluminous material containing a considerable amount of silica had been incorporated:

|  | Hydrated lime with 10% aluminate. | Hydrated lime with 15% aluminate. |
| --- | --- | --- |
| 24 hours | 35 lbs. | 38 lbs. |
| 7 days | 66 lbs. | 68 lbs. |
| 28 days | 75 lbs. | 78 lbs. |

Various proportions of the higher lime aluminous accelerator which may be produced by the calcination of about one to three molecular weights of lime to one of alumina may be added to slaked lime so as to secure the desired quickness of set and increase of strength of the material. A good composition for use as commercial wall plaster may be prepared by incorporating such an amount of aluminous accelerating material with lime or other plaster material as to increase its alumina content from one to ten per cent., the ingredients being preferably thoroughly mixed by grinding them together or otherwise. The hardness and strength of plastic, that is to say, cementitious materials of this character, may be increased by the incorporation of a suitable small proportion of silicious or Puzzolanic material to the extent of about one to ten per cent.; it being also desirable to add from one to five per cent. of plaster of Paris to control the setting. A desirable composition for general use as wall plaster may be prepared by incorporating eighty-six parts of dry hydrated lime, ten parts of calcium aluminate accelerating material containing approximately 40% of alumina, two parts of plaster of Paris and two parts of infusorial earth. This material when the components were thoroughly incorporated and finely ground together so that ninety-five per cent. passed through a one hundred mesh sieve had an initial setting time of about four hours and was completely set in about fifteen hours according to the indications of the standard Vicat needle test. A sample of this highly cementitious material when tested in the ordinary way with three parts of commercial sand in air gave the following high tensile strengths: at seven days 125 pounds per square inch and at twenty-eight days 151 pounds per square inch.

Having described the invention in this case, which is a continuation, that is, contains subject matter taken from our copending applications filed September 27, 1907, as Serial No. 394,916, and renewed November 22, 1909, as Serial No. 529,294, filed July 3, 1908, as Serial No. 441,731, and filed March 29, 1909 as Serial No. 486,432, in connection with a number of illustrative ingredients, proportions, formulas, and methods of preparation, to the details of which disclosure the invention is not of course to be limited, what is claimed as new and what is desired to be secured by Letters Patent is set forth in the appended claims:

1. The hydraulic quick setting highly cementitious cement material capable of developing and accelerating the cementitious properties and early strengths of coöperating cementitious material containing available lime when incorporated therewith and formed by calcining a mixture of lime and bauxite, the lime being present in amounts slightly more than sufficient to be capable of combining in dicalcic proportions with the alumina in addition to combining with any silica and other coöperating materials.

2. The hydraulic quick setting highly cementitious cement material capable of developing and accelerating the cementitious properties and early strengths of coöperating cementitious material containing available lime when incorporated therewith and formed by calcining a mixture of lime and material rich in alumina, the lime being present in amounts slightly more than sufficient to be capable of combining in dicalcic proportions with the alumina in addition to combining with any silica and other coöperating materials.

3. The cement material capable of developing or accelerating the cementitious properties and early strengths of coöperating cementitious material containing available lime when incorporated therewith and formed by uniting at high heat a mixture of lime and material rich in alumina, the lime being present in amounts slightly more than sufficient to be capable of combining in dicalcic proportions with the alumina in addition to combining with any silica or other coöperating materials.

4. The cement material capable of developing or accelerating the cementitious properties and early strengths of coöperating cementitious material containing available lime when incorporated therewith and formed by uniting at high heat a mixture of lime and material rich in alumina, the lime being present in amounts more than sufficient to be capable of combining in dicalcic proportions with the alumina in addition to combining with any silica and other coöperating materials.

5. The cement material capable of developing or accelerating the cementitious properties of coöperating cementitious materials containing available lime when incorporated therewith and formed by uniting a mixture of lime and material rich in alumina, the lime being present in amounts more than sufficient to be capable of combining in dicalcic proportions with the alumina in addition to combining with any silica and other coöperating materials.

6. The calcium aluminate cement material capable of developing and accelerating the cementitious properties and early strengths of coöperating cementitious material containing available lime when incorporated therewith and being relatively high in alumina and low in silica and formed by uniting at high heat a mixture of lime and aluminous material containing iron and silica, the lime being present in amounts more than sufficient to be capable of combining in dicalcic proportions with the alumina in addition to combining with any silica and other coöperating materials.

7. The calcium aluminate cement material capable of developing and accelerating the cementitious properties and early strengths of coöperating cementitious material containing available lime when incorporated therewith and formed by uniting at high heat a mixture of lime and bauxite, the lime being present in amounts more than sufficient to be capable of combining in dicalcic proportions with the alumina in addition to combining with any silica and other coöperating materials.

8. The cement material capable of developing or accelerating the cementitious properties of coöperating cementitious material containing available lime when incorporated therewith and formed by uniting a mixture of lime and bauxite, the lime being present in said cement material in amounts more than sufficient to be capable of combining in dicalcic proportions with the alumina in addition to combining with any silica and other coöperating materials.

9. The high lime, cement material capable of developing or accelerating the cementitious properties of coöperating cementitious material containing large proportions of available lime when incorporated therewith and formed by uniting at high heat lime and high aluminous material.

10. The high lime, cement material capable of developing or accelerating the cementitious properties of coöperating cementitious material containing large proportions of available lime when incorporated therewith and formed by uniting at high heat lime and material rich in alumina-like material.

11. The high lime, cement material capable of developing or accelerating the cementitious properties of coöperating cementitious material containing large proportions of available lime when incorporated therewith and formed by uniting at high heat aluminous material and earthy alkali material capable of uniting therewith.

12. The high lime, calcium aluminate, cement material capable of developing or accelerating the cementitious properties of coöperating cementitious material containing large proportions of available lime when incorporated therewith and formed by uniting by calcination lime and high aluminous material containing iron and silica.

13. The high lime, calcium aluminate, cement material capable of developing or accelerating the cementitious properties of coöperating cementitious material containing large proportions of available lime when incorporated therewith and relatively high in alumina and low in silica formed by uniting lime and aluminous material containing iron or silica.

14. The high lime, calcium aluminate, cement material capable of developing or accelerating the cementitious properties of coöperating cementitious material containing large proportions of available lime when incorporated therewith and containing about forty per cent. of alumina formed by uniting lime and high aluminous material.

15. The high lime, calcium aluminate, cement material capable of developing or accelerating the cementitious properties of coöperating cementitious material containing large proportions of available lime when incorporated therewith and containing about forty per cent. of alumina formed by uniting at high heat lime and bauxite.

16. The cement material capable of developing or accelerating the cementitious properties of coöperating cementitious material containing large proportions of available lime when incorporated therewith and comprising earthy alkali compounds relatively high in alumina-like material and low in silica formed by uniting large proportions of earthy alkali material with alumina-like material.

17. The high lime, calcium aluminate, cement material capable of developing or accelerating the cementitious properties of coöperating cementitious material containing large proportions of available lime when incorporated therewith, the lime being present in said cement material in amounts more than sufficient to be capable of combining in dicalcic proportions with the alumina in addition to combining with any silica and other coöperating material.

18. The high lime, calcium aluminate, cement material capable of developing or accelerating the cementitious properties of coöperating cementitious material containing large proportions of available lime when incorporated therewith and containing about forty per cent. of alumina.

19. The cement material capable of developing or accelerating the cementitious properties of coöperating cementitious material containing available lime when incorporated therewith, the lime being present in said cement material in amounts more than sufficient to be capable of combining in dicalcic proportions with the alumina in addition to combining with any silica and other coöperating material.

20. The cement material capable of developing or accelerating the cementitious properties of coöperating cementitious material containing large proportions of available lime when incorporated therewith and comprising earthy alkali compounds relatively high in alumina-like material and low in silica.

HENRY S. SPACKMAN.
ELLIS W. LAZELL.

Witnesses to the signature of Henry S. Spackman:
HARRY L. DUNCAN,
JESSIE B. KAY.

Witnesses to the signature of Ellis W. Lazell:
WILLIAM P. WHITE,
JOHN STROUD.

EXTENSION OF PATENT.

Patent No. 1,029,954.  Granted June 18, 1912, to

HENRY S. SPACKMAN.

The above entitled patent has been extended, under the provisions of the Act of May 31, 1928, for five years, eleven months and twenty-four days from the expiration of the original term thereof.

*Thomas E. Robertson*
Commissioner of Patents.

April 26, 1930.

celerating the cementitious properties of coöperating cementitious material containing large proportions of available lime when incorporated therewith, the lime being present in said cement material in amounts more than sufficient to be capable of combining in dicalcic proportions with the alumina in addition to combining with any silica and other coöperating material.

18. The high lime, calcium aluminate, cement material capable of developing or accelerating the cementitious properties of coöperating cementitious material containing large proportions of available lime when incorporated therewith and containing about forty per cent. of alumina.

19. The cement material capable of developing or accelerating the cementitious properties of coöperating cementitious material containing available lime when incorporated therewith, the lime being present in said cement material in amounts more than sufficient to be capable of combining in dicalcic proportions with the alumina in addition to combining with any silica and other coöperating material.

20. The cement material capable of developing or accelerating the cementitious properties of coöperating cementitious material containing large proportions of available lime when incorporated therewith and comprising earthy alkali compounds relatively high in alumina-like material and low in silica.

HENRY S. SPACKMAN.
ELLIS W. LAZELL.

Witnesses to the signature of Henry S. Spackman:
HARRY L. DUNCAN,
JESSIE B. KAY.

Witnesses to the signature of Ellis W. Lazell:
WILLIAM P. WHITE,
JOHN STROUD.

EXTENSION OF PATENT.

Patent No. 1,029,954.  Granted June 18, 1912, to

HENRY S. SPACKMAN.

The above entitled patent has been extended, under the provisions of the Act of May 31, 1928, for five years, eleven months and twenty-four days from the expiration of the original term thereof.

*Thomas E. Robertson*
Commissioner of Patents.

April 26, 1930.

EXTENSION OF PATENT.

Patent No. 1,029,954.  Granted June 18, 1912, to

HENRY S. SPACKMAN.

The above entitled patent has been extended, under the provisions of the Act of May 31, 1928, for five years, eleven months and twenty-four days from the expiration of the original term thereof.

*Thomas E. Robertson*
Commissioner of Patents.

April 26, 1930.